United States Patent
Knepp et al.

(10) Patent No.: US 11,214,439 B2
(45) Date of Patent: Jan. 4, 2022

(54) AUTOMATED TUGGER CART ASSEMBLY

(71) Applicant: J-Tec Industries, Inc., East Peoria, IL (US)

(72) Inventors: Joseph Wayne Knepp, East Peoria, IL (US); Christopher Jacob Camp, East Peoria, IL (US); Wayne Andrew Knepp, East Peoria, IL (US); Nicholas Michael Kaiser, East Peoria, IL (US)

(73) Assignee: J-Tec Industries, Inc., East Peoria, IL (US)

( * ) Notice: Subject to any disclaimer, the term of this patent is extended or adjusted under 35 U.S.C. 154(b) by 151 days.

(21) Appl. No.: 16/811,858

(22) Filed: Mar. 6, 2020

(65) Prior Publication Data

US 2021/0276806 A1 Sep. 9, 2021

(51) Int. Cl.
*B65G 1/137* (2006.01)

(52) U.S. Cl.
CPC .................................. *B65G 1/1375* (2013.01)

(58) Field of Classification Search
CPC combination set(s) only.
See application file for complete search history.

(56) References Cited

U.S. PATENT DOCUMENTS

| | | | |
|---|---|---|---|
| 4,096,920 A | 6/1978 | Heyn | |
| 4,127,202 A * | 11/1978 | Jennings | B60D 1/173 280/408 |
| 4,439,103 A | 3/1984 | Almagor | |
| 5,439,069 A | 8/1995 | Beeler | |
| 6,086,308 A | 7/2000 | Sjogren et al. | |
| 6,695,564 B2 | 2/2004 | Pfisterer | |
| 6,866,463 B2 * | 3/2005 | Riordan | B62B 3/04 280/79.3 |
| 8,302,975 B2 * | 11/2012 | Hergeth | B62D 53/005 280/47.19 |
| 8,490,993 B2 | 7/2013 | Benoit | |
| 9,008,825 B2 | 4/2015 | Benjamin et al. | |
| 9,211,900 B2 | 12/2015 | Knepp | |
| 9,738,299 B2 | 8/2017 | Ard et al. | |
| 9,738,465 B2 | 8/2017 | Berghammer | |
| 10,093,334 B1 | 10/2018 | Brown et al. | |
| 10,106,184 B2 | 10/2018 | Johnson et al. | |
| 10,150,522 B2 | 12/2018 | Scarth et al. | |
| 10,246,130 B2 | 4/2019 | Bruns et al. | |
| 2015/0001830 A1 * | 1/2015 | Badura | B62D 53/005 280/408 |

(Continued)

*Primary Examiner* — Kyle O Logan
(74) *Attorney, Agent, or Firm* — Kilyk & Bowersox, P.L.L.C.

(57) ABSTRACT

A tugger cart includes a tugger frame having a first side member, a second side member, and a clasping member. A plurality of wheels are coupled to a bottom of the tugger frame. Each of the first side member and the second side member include a plurality of roller wheels rotatably coupled to an inner side and rotatable about a horizontal axis. The plurality of roller wheels align along an angled plane that declines from a rear of the tugger frame to a front of the tugger frame. The clasping member includes at least one fixed arm, at least one telescoping arm, an actuator, and a grab arm extendable and retractable from the at least one telescoping arm. The actuator converts the telescoping arm between an extended position and a retracted position.

10 Claims, 4 Drawing Sheets

(56) References Cited

U.S. PATENT DOCUMENTS

| | | | |
|---|---|---|---|
| 2015/0225007 A1* | 8/2015 | Knepp | B62D 53/005 |
| | | | 280/47.18 |
| 2015/0239383 A1* | 8/2015 | Neubauer | B60P 1/02 |
| | | | 414/495 |
| 2015/0251583 A1* | 9/2015 | Ziemann | B62D 63/062 |
| | | | 414/495 |
| 2018/0170468 A1* | 6/2018 | Berghammer | B62D 53/005 |
| 2019/0225285 A1* | 7/2019 | Packeiser | B66F 9/063 |
| 2020/0001907 A1 | 1/2020 | Scarth et al. | |
| 2020/0130759 A1* | 4/2020 | Berghammer | B60L 50/66 |

* cited by examiner

AUTOMATED TUGGER CART ASSEMBLY

BACKGROUND OF THE INVENTION

The present invention relates to tugger carts and, more particularly, to a automated tugger cart assembly.

In the world of intra-plant material handling, a common approach to conveying material from one location to another is called a tugger/rider cart system. The system consists of three components; a tugger truck, tugger cart, and rider cart. The tugger truck pulls a train of tugger carts, with rider carts on board, from location to location in a factory or warehouse. For example, the rider carts are loaded with material at a picking station or supermarket. They are then loaded on to the tugger carts. After that, they are tugged to the unload area, unloaded off of the tugger carts, and pushed into their final position on the assembly line. At this point, the empty tugger carts may be reloaded with empty rider carts and returned to the picking station.

When loading a rider cart with a heavy load onto an inclined plane of a tugger cart, the force is very great—above many company's ergonomic requirements for hand loading or pushing a cart. Current systems rely on an operator to manually push to load a cart into a tugger system, and also to exert effort to pull the cart back out of the tugger system. This decreases workplace safety and increases the risk of injury or fatigue. Humans can only exert so much force safely. In order to load and unload a cart from an all-mechanical system with no electric or gravity assist, much force is required by a human operator to engage the rider cart with the tugger cart system.

As can be seen, there is a need for an automated tugger cart assembly.

SUMMARY OF THE INVENTION

In one aspect of the present invention, a tugger cart comprises: a tugger frame comprising a first side member, a second side member, and a clasping member; and a plurality of wheels coupled to a bottom of the tugger frame, wherein each of the first side member and the second side member comprise a plurality of roller wheels rotatably coupled to an inner side and rotatable about a horizontal axis, wherein the plurality of roller wheels align along an angled plane that declines from a rear of the tugger frame to a front of the tugger frame; and the clasping member comprises at least one fixed arm, at least one telescoping arm, an actuator, and a grab arm extendable and retractable from the at least one telescoping arm, wherein the actuator converts the at least one telescoping arm between an extended position and a retracted position, the extended position comprising the telescoping arm extending out of the at least one fixed arm and the retracted position comprising the telescoping arm retracted into the at least one fixed arm.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an auto-loading and auto-unloading industrial tugger cart. The present invention includes a tugger cart that automatically loads or unloads a rider cart onto or off of the tugger cart. The present invention reduces manpower by automating the material handling process. The tugger cart may be driven by an AGV/VGV or manual tugger truck. As it nears an area to where a rider cart needs to be moved, the tugger cart senses the rider cart's location and stops at the appropriate area. A mechanical arm is energized and moves to position underneath the rider cart. The mechanical arm then grabs onto the rider cart and pulls the rider cart onto the tugger cart by an electric motor. The rider cart elevates off of the ground by an inclined plane of cam followers, removing the rider cart's casters from contact with the ground. When the tugger cart approaches an area to unload, the tugger cart reverses the process and automatically unloads the rider cart into a predefined area using sensors to know when the rider cart is loaded or unloaded.

Figure 1:
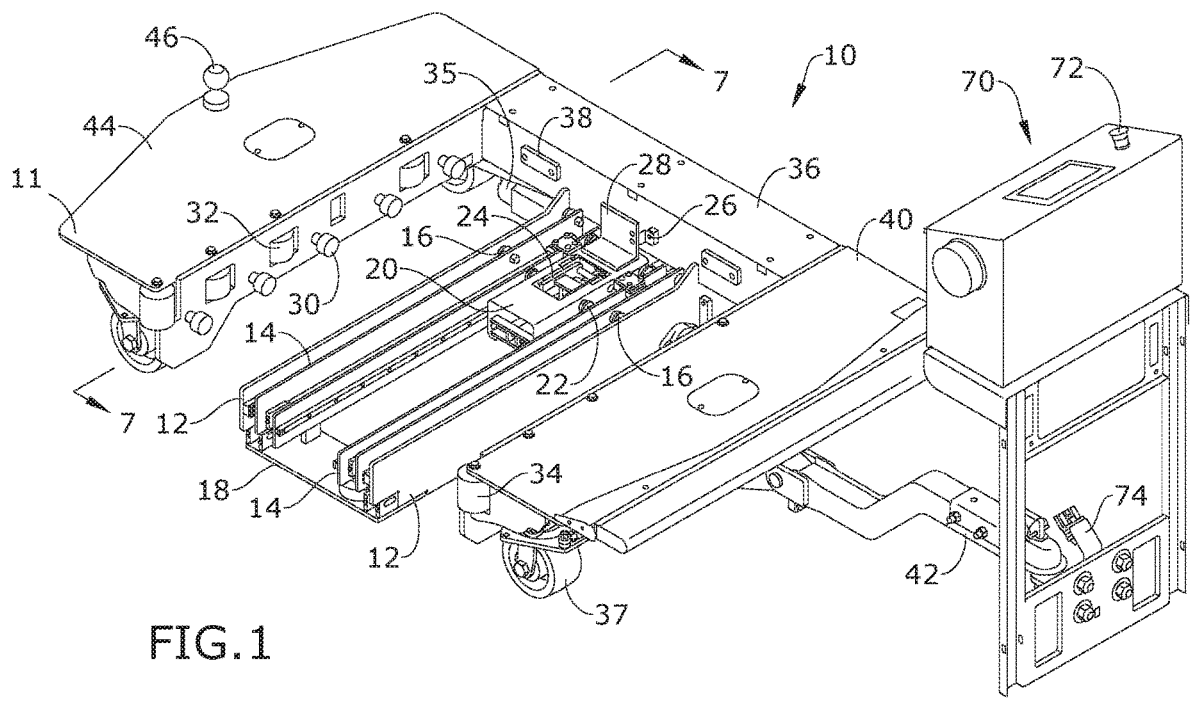
FIG. 1 is a perspective view of an embodiment of the present invention.
Figure 2:
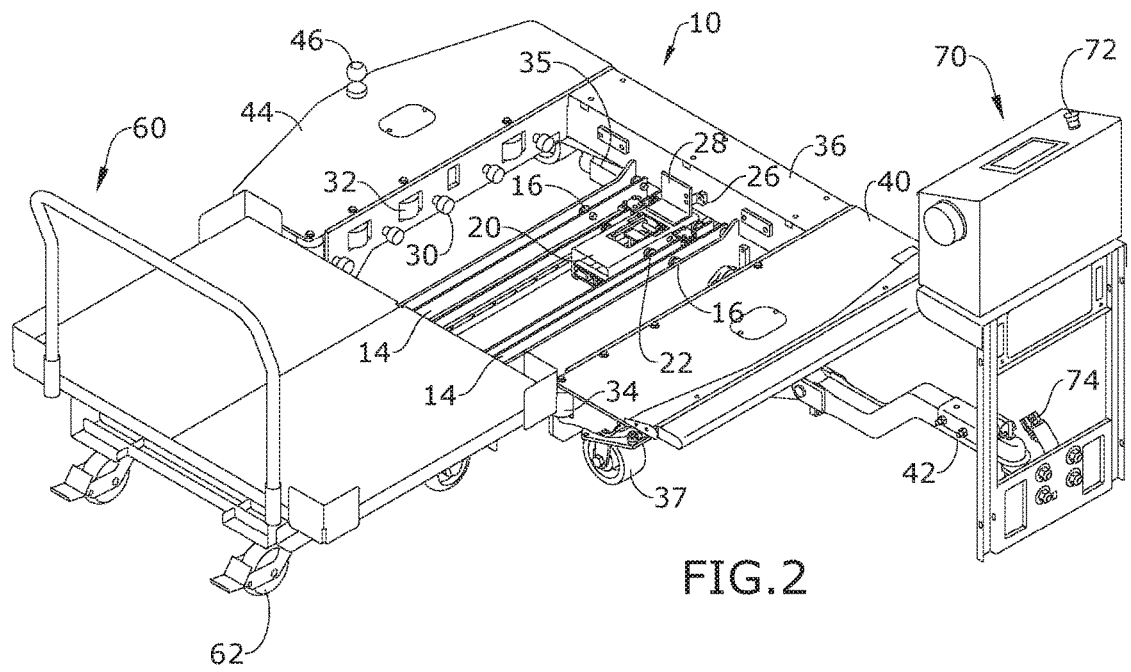
FIG. 2 is a perspective view of an embodiment of the present invention, illustrating loading of a rider cart.
Figure 3:
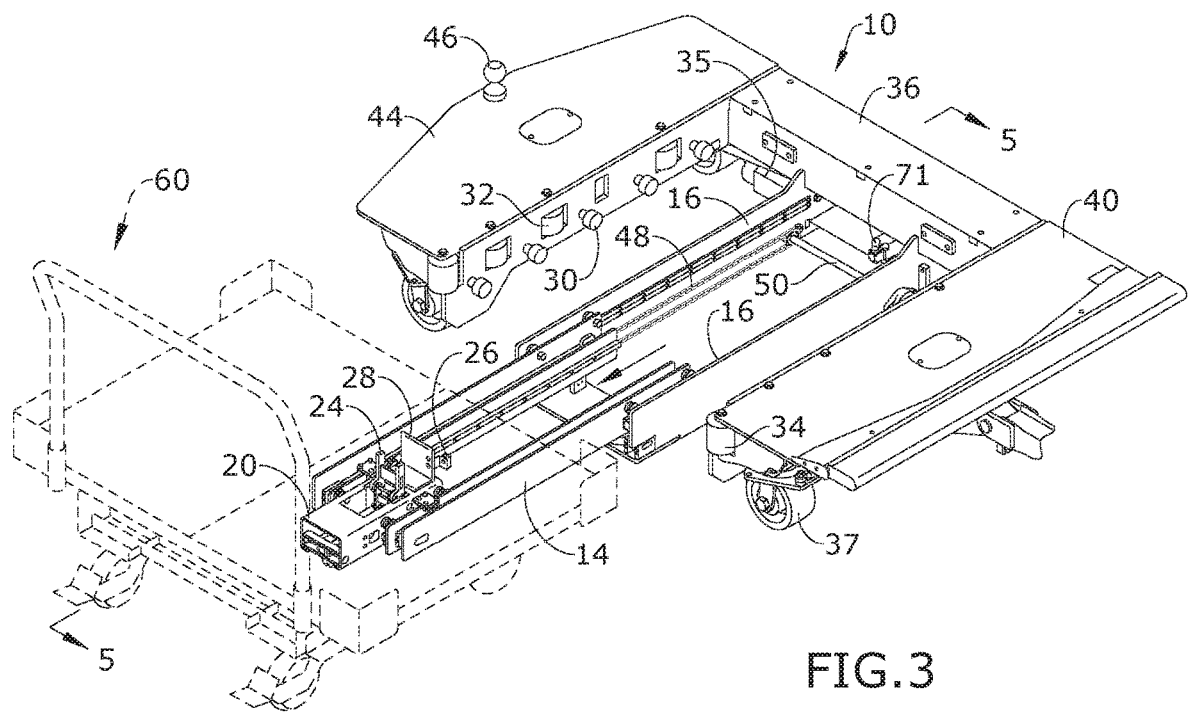
FIG. 3 is a perspective view of an embodiment of the present invention, illustrating loading of a rider cart.
Figure 4:
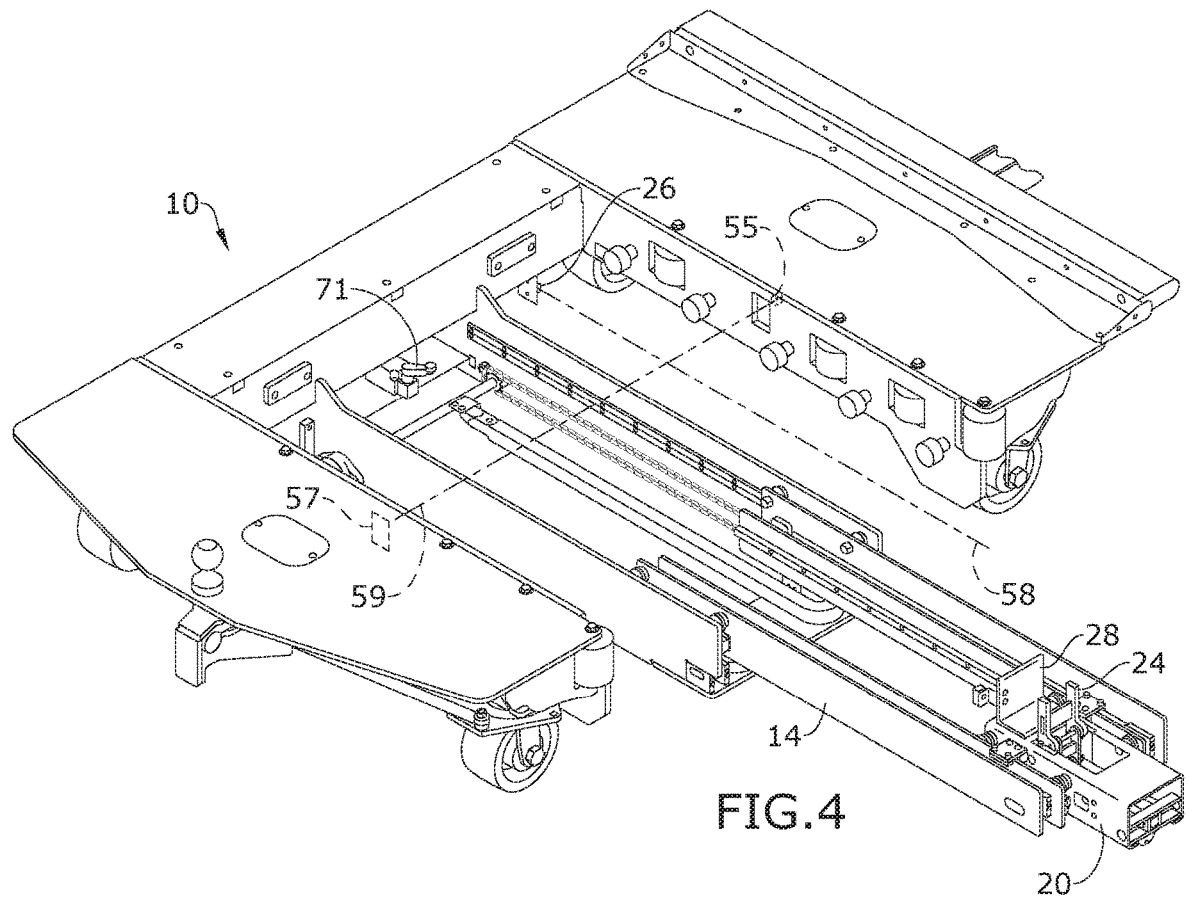
FIG. 4 is a perspective view of an embodiment of the present invention, illustrating loading of a rider cart.
Figure 5:
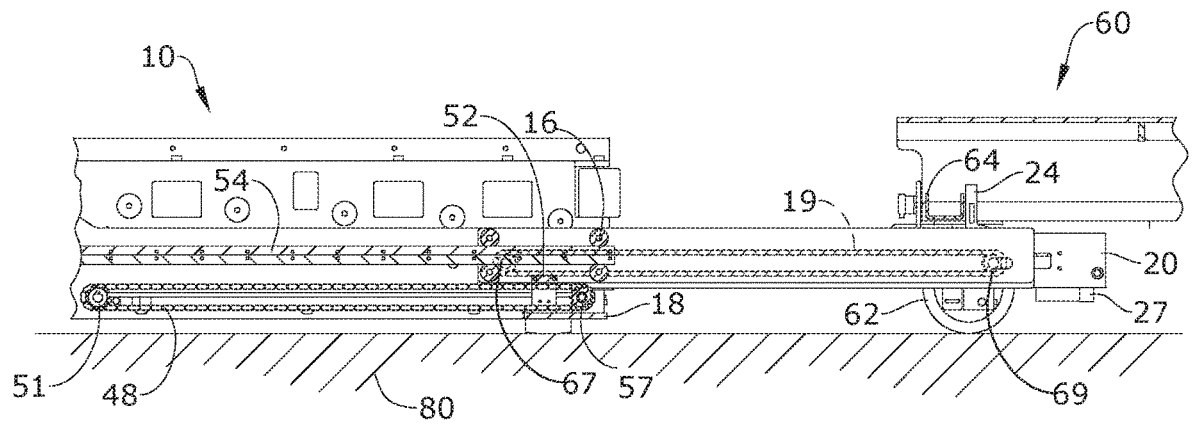
FIG. 5 is a section view of the present invention taken along line 5-5 in FIG. 3.
Figure 6:
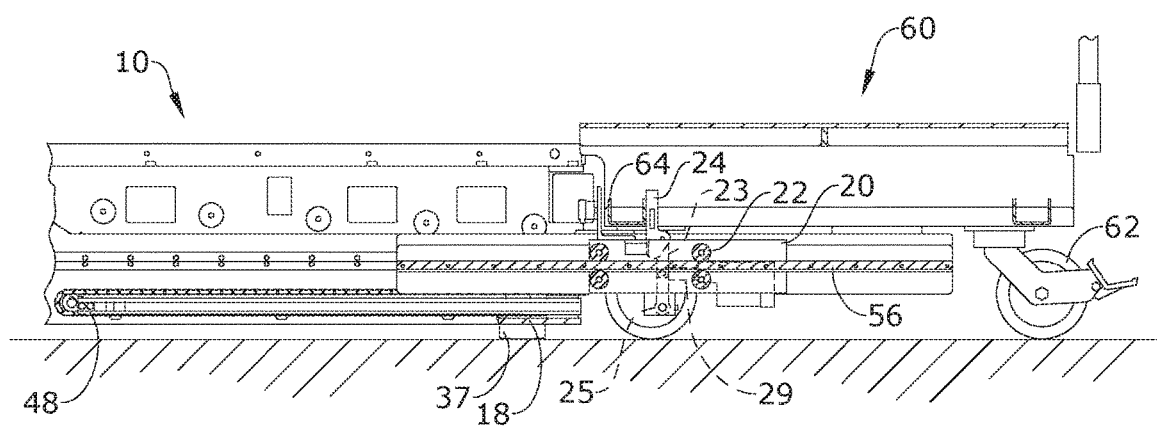
FIG. 6 is a section view of an embodiment of the present invention.
Figure 7:
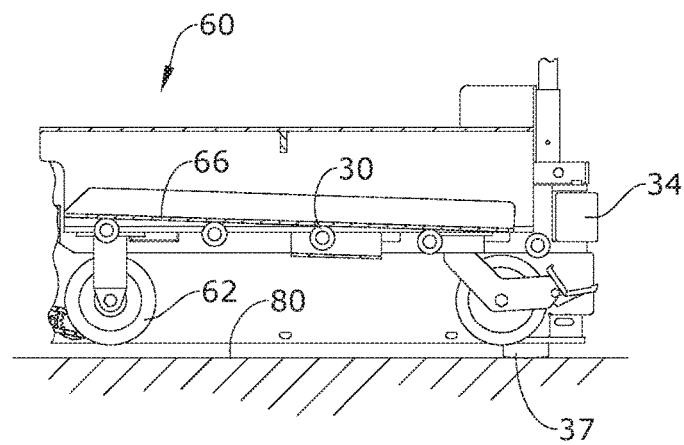
FIG. 7 is a section view of the present invention taken along line 7-7 in FIG. 1, illustrating a loaded rider cart.
Figure 8:
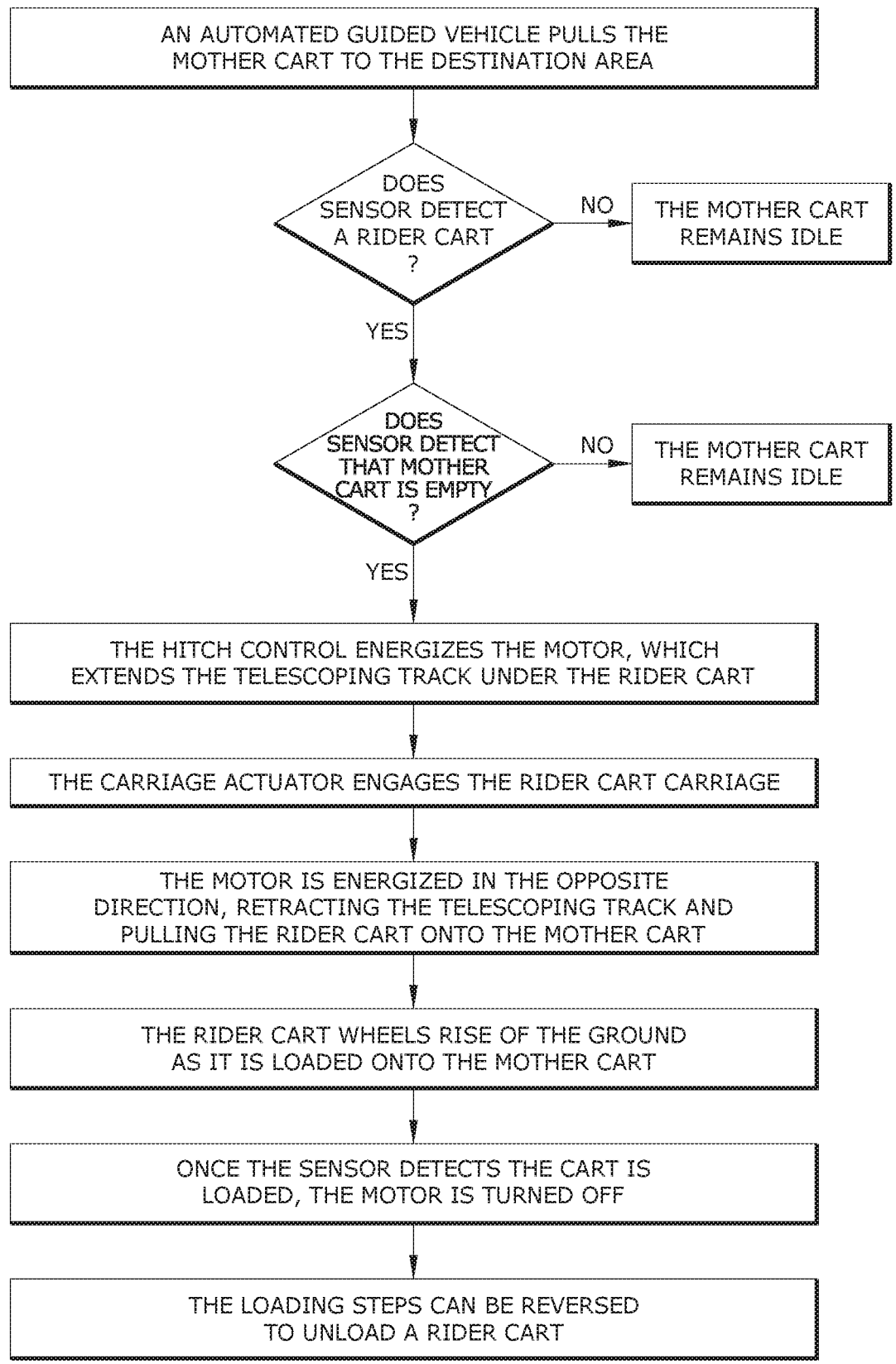
FIG. 8 is a flow chart of an embodiment of the present invention.

Referring to FIGS. 1 through 7, the present invention may include a tugger cart 10. The tugger cart 10 includes a tugger frame 11. The tugger frame 11 may include a first side member 44, a second side member 40, a clasping member 18, and a transverse member 36. The clasping member 18 may be disposed in between the first side member 44 and the second side member 40. The first side member 44, the clasping member 18, and the second side member 40 may be joined together at a rear end of the tugger frame 11 by the transverse member 36. Channels may be defined between the first side member 44, the clasping member 18, and the second side member 40. A plurality of wheels 37, such as casters, may be attached to a bottom of the tugger frame 11.

The clasping member 18 extends out from the tugger cart 10, attaches to a rider cart 60, retracts with the rider cart 60, and mounts the rider cart 60 onto the tugger cart 10. The clasping member 18 includes fixed arms 12 and telescoping arms 14. An actuator 35, such as an electric motor, drives the telescoping arms 14 between an extended position and a retracted position. The extended position includes the telescoping arms 14 extending out from the fixed arms 12 and the retracted position includes the telescoping arms 14 retracted into the fixed arms 12. A grab arm 24 is extendable and retractable from the telescoping arms 14 by a grab arm actuator.

The present invention may further include a computing system with a processor and a memory. The computing system may be in communication with at least one sensor 26. The sensor 26 may include a motion detector that measures an amount of sound or radiation reflected from the rider cart 60. The sensor 26 may also include a scanner or an RFID sensor that detects a rider cart 60 within a proximity and location. If the sensor 26 senses a rider cart 60 is in a position in front of the clasping member 18, the processor activates the actuator 35 to extend the telescoping arms 14 to the extended position. The present invention further include additional sensors 55 that senses whether the tugger cart 10 is carrying a rider cart 60. A limit switch 71 senses when the center housing 20 retracts into the tugger frame and rear bracket 28 engages with the limit switch telling the hitch control 70 that center housing 20 is in the fully retracted position.

Each of the first side member 44 and the second side member 40 may include a plurality of roller wheels 30 rotatably coupled to an inner side and rotatable about a horizontal axis. The plurality of roller wheels 30 align along an angled plane that declines from a rear of the tugger frame 11 to a front of the tugger frame 11. Each of the first side member 44 and the second side member 40 also include a front guide wheels 34 and a plurality of side guide wheels 32 rotatably coupled to the inner side and rotatable about a vertical axis. While the telescoping arms 14 retract the rider cart 60 onto the tugger cart 10, the guide wheels 32, 34 guide the rider cart 60 onto the roller wheels 30. The telescoping arms 14 pull the rider cart 60 up the incline of the roller wheels 30, thereby elevating the rider cart 60 up off of the ground 80 and onto the tugger cart 10.

In certain embodiments, the actuator 35 of the present invention is a motor that rotates a spindle 50. A first gear 51 is coupled to a proximal end of the fixed arms 12 and a second gear 57 is coupled to a distal end of the fixed arms 12. A first drive chain 48 is in communication with the first gear 51 and the second gear 57. The spindle 50 is coupled to the first gear 51 and rotates the first gear 51 when the motor is turned on to rotate the spindle 50. The telescoping arms 14 include a plurality of wheels 16 disposed within a track 54 of the fixed arms 12. The telescoping arms 14 are coupled to the first drive chain 48 by a chain carrier 52. Therefore, when the motor drives the first gear 51, the first drive chain 48 is rotated, and the telescoping arms 14 are either extended or retracted depending on the direction of rotation.

In certain embodiments, a center housing 20 is coupled to the telescoping arms 14. The center housing 20 houses the grab arm 24 and the grab arm actuator. In such embodiments, a third gear 67 and a fourth gear 69 are coupled to opposing ends of the telescoping arms 14. A second drive chain 19 is in communication with the third gear 67 and the fourth gear 69. The second drive chain 19 is coupled to the first drive chain 48 and the center housing 20 is coupled to the second drive chain 19. The center housing 20 may also include a plurality of wheels 22 disposed within a track 56 of the telescoping arms 14. Therefore, when the motor drives the spindle 50, the first drive chain 48 is rotated which rotates the second drive chain 19 about the third gear 67 and the fourth gear 69. The center housing 20 is thereby driven along the track 56 of the telescoping arms 14 to extend underneath the rider cart 60 when the spindle 50 is rotated in a first direction. The center housing 20 is retracted along the track 56 of the telescoping arms 14 when the spindle 50 is rotated in a second direction, opposite the first direction.

In certain embodiments, the present invention may include a plurality of tugger carts 10, such as a first tugger cart 10 and a second tugger cart 10. The first tugger cart 10 and the second tugger cart 10 may be releasably attachable. For example, the tugger cart 10 may include a rim protruding from the first side member 40 and the second side member 44. The rim may include a top surface. At least one hitch ball 46 may be attached to a top surface of one of the rims. The other of the rims may include a hitch receiver 42. The hitch receiver 42 of one cart 10 may connect to the hitch ball 46 of another cart 10.

The rider cart 60 may be loaded and unloaded onto the tugger cart 10. The rider cart 60 may include a rider frame 64 having a front end, a rear end, a first side, a second side, a top and a bottom. A plurality of wheels 62 may be attached to the bottom. A platform may be coupled to the rider frame 64. Angled rider cart flanges 66 may extend laterally from the rider frame 64 beneath the platform and may engage the plurality of roller wheels 30 when mounted to the tugger cart 10.

The tugger cart 10 may be pulled by an AGV or tugger truck and is designed for carrying a rider cart 60. The motor 35 is triggered by a sensor 26 and a hitch control 70 that activates the telescoping arm 14 outward. The telescoping arm 14 is what extends the center housing 20 in position underneath or alongside the rider cart 60 and retracts the center housing 20 and rider cart 60 back into the tugger cart 10. The center housing 20 houses the grab arm 24 which attaches to the rider cart 60 and the grab arm actuator that moves the grab arm 24 up and down. The grab arm 24 is mechanically driven upward or downward by the grab arm actuator and makes physical contact with the rider cart 60 to pull it onto or off of the tugger cart 10. The grab arm actuator drives the grab arm 24 up or down when a signal from the hitch controller 70 is received. The plurality of roller wheels 30 are mounted to the first side member 44 and the second side member 40 by shaft bearings that allow a smooth inclined plane for the rider cart 60 to be pulled against and elevated off of the ground. Guide wheels 32, 34 guide the rider cart 60 side to side into position to maintain alignment within the tugger cart 10 confines. Bumpers 38 are fixed on the transverse member 36 and receive the rider cart 60 when mounted on the tugger cart 10. A cart presence sensor 26 senses whether there is a rider cart 60 or no cart when the tugger cart 10 arrives at a predefined location in the warehouse. Cart loaded sensor sends a signal to the hitch controller 70 once the rider cart 60 is fully loaded into the tugger cart 10 and ready for transport. Emergency stop 72 of the hitch controller 70 is able to be operated by hand to stop all electrical movement of components within the tugger cart 10. Hitch controller 70 may be mounted to the AGV, VGV or tugger truck and connects via wires 74 to the tugger cart 10. The hitch controller 70 may house the computing system including a processor and a memory to execute electrical functions based on sensor inputs.

It should be understood, of course, that the foregoing relates to exemplary embodiments of the invention and that modifications may be made without departing from the spirit and scope of the invention as set forth in the following claims.

What is claimed is:
1. A tugger cart comprising:
   a tugger frame comprising a first side member, a second side member, and a clasping member; and
   a plurality of wheels coupled to a bottom of the tugger frame, wherein
   each of the first side member and the second side member comprise a plurality of roller wheels rotatably coupled to an inner side and rotatable about a horizontal axis, wherein the plurality of roller wheels align along an angled plane that declines from a rear of the tugger frame to a front of the tugger frame; and the clasping member comprises at least one fixed arm, at least one telescoping arm, an actuator, and a grab arm extendable and retractable from the at least one telescoping arm, wherein the actuator converts the at least one telescoping arm between an extended position and a retracted position, the extended position comprising the telescoping arm extending out of the at least one fixed arm and the retracted position comprising the telescoping arm retracted into the at least one fixed arm.

2. The tugger cart of claim 1, further comprising a processor, a memory, and a sensor, wherein when the sensor senses a rider cart in a position in front of the clasping member, the processor activates the actuator to extend the at least one telescoping arm to the extended position.

3. The tugger cart of claim 2, wherein the grab arm extends from the telescoping arm once the at least one telescoping arm is fully in the extended position.

4. The tugger cart of claim 1, wherein the actuator comprises a motor that rotates a spindle, wherein a first gear is coupled to spindle and a second gear is coupled to an opposing end of the clasping member, and a first drive chain is in communication with the first gear and the second gear, wherein the at least one telescoping arm is coupled to the first drive chain.

5. The tugger cart of claim 4, wherein the at least one telescoping arm comprises a plurality of wheels disposed within a track of the at least one fixed arm.

6. The tugger cart of claim 4, further comprising a center housing coupled to the at least one telescoping arm, wherein the center housing comprises the grab arm.

7. The tugger cart of claim 5, further comprising a third gear and a fourth gear coupled to opposing ends of the at least one telescoping arm, a second drive chain in communication with the third gear and the fourth gear, the second drive chain coupled to the first drive chain, and the center housing coupled to the second drive chain.

8. The tugger cart of claim 7, wherein the center housing comprises a plurality of wheels disposed within a track of the at least one telescoping arm.

9. The tugger cart of claim 1, wherein the each of the first side member and the second side member further comprise a plurality of guide wheels rotatably coupled to the inner side and rotatably about a vertical axis.

10. A tugger cart comprising:
a tugger frame comprising a first side member, a second side member, and a clasping member disposed in between the first side member and the second side member;
a computing system comprising a processor and a memory;
a sensor; and
a plurality of wheels coupled to a bottom of the tugger frame, wherein
each of the first side member and the second side member comprise a plurality of roller wheels rotatably coupled to an inner side and rotatable about a horizontal axis, wherein the plurality of roller wheels align along an angled plane that declines from a rear of the tugger frame to a front of the tugger frame,
the clasping member comprises at least one fixed arm, at least one telescoping arm, an actuator, and a grab arm extendable and retractable from the at least one telescoping arm, wherein the actuator converts the at least one telescoping arm between an extended position and a retracted position, the extended position comprising the telescoping arm extending out of the at least one fixed arm and the retracted position comprising the telescoping arm retracted into the at least one fixed arm, and
when the sensor senses a rider cart in a position in front of the clasping member, the processor activates the actuator to extend the at least one telescoping arm to the extended position, deploy the grab arm, and retract the at least one telescoping arm to the retracted position.

* * * * *